United States Patent [19]

Johnson

[11] 4,038,866

[45] Aug. 2, 1977

[54] ELECTRONIC PROBE FOR SENSING AND REPRODUCING THE SOUND OF MECHANICAL MOVEMENT

[76] Inventor: John F. Johnson, 2535 E. Linda Circle, Phoenix, Ariz. 85024

[21] Appl. No.: 714,108

[22] Filed: Aug. 13, 1976

[51] Int. Cl.² .............................................. G01H 1/00
[52] U.S. Cl. .......................................... 73/71.2; 310/15
[58] Field of Search .................. 73/71.2, 71.4; 310/20, 310/23, 15

[56] References Cited

U.S. PATENT DOCUMENTS

| 2,074,417 | 3/1937 | Olsen | 73/71.2 X |
| 2,826,706 | 3/1958 | Sackett | 73/71.2 X |
| 2,900,039 | 8/1959 | Burnett | 310/20 |
| 3,477,280 | 11/1969 | Blackmer | 73/71.4 |

*Primary Examiner*—James J. Gill
*Attorney, Agent, or Firm*—Warren F. B. Lindsley

[57] ABSTRACT

A vibration detector including a probe, a transducer and an amplifier coupled to visual and audible read-out devices for monitoring mechanical and electromechanical equipment during operation.

8 Claims, 7 Drawing Figures

ELECTRONIC PROBE FOR SENSING AND REPRODUCING THE SOUND OF MECHANICAL MOVEMENT

BACKGROUND OF THE INVENTION

The ability to monitor and detect vibrations originating in different parts of various kinds of equipment such as reciprocating engines, gas turbines, compressors, electric motors and generators, etc. is useful in a number of ways. A device with this capability is useful, for example, in the routine inspection of such equipment during initial qualification testing at the end of an assembly line. It may also be used as a means for diagnostic testing as an aid in the determination of the source of a mechanical or electrical malfunction. There are also applications for devices of this type in which it is appropriate to provide continuous monitoring of specific parts or elements of a critically important system in order to have advance notice of impending mechanical problems so that appropriate corrective action may be taken to prevent a malfunction.

DESCRIPTION OF THE PRIOR ART

Devices heretofore available for such purposes have been deficient in a number of ways. Functional limitations have included poor frequency response, inadequate selectivity in terms of rejecting unwanted electrical and mechanical noise sources in preference to the one selected, and excessive vulnerability to damage through exposure to temperature, humidity and mechanical shock.

In U.S. Pat. No. 2,900,039 H. J. Burnett describes a vibration pickup device in which the signal was coupled from the probe through an air medium to an electromagnetic transducer. The experience of the present invention has been that while the choice of an electromagnetic transducer is appropriate, the air coupling means results in very low energy levels at the transducer. As a consequence, relatively poor selectivity is achieved so that it is very difficult to distinguish the desired signal from the ambient.

J. S. Kresge, U.S. Pat. No. 3,173,086 describes another related device which is intended for sensing audible noise produced by corona from high-voltage transformers, insulators etc. Kresge's device employs a piezo-electric crystal as a transducer element. While this type of transducer can be made to perform with satisfaction initially, it is subject to damage and subsequent malfunction through exposure to temperature and humidity. The crystal itself breaks down at 135° F, a condition which might readily occur, for example, if the probe is left lying on the seat of an automobile on a hot sunny day.

SUMMARY OF THE INVENTION

In accordance with the invention claimed, an improved probe, transducer, amplifier and read-out device is provided which overcomes the limitations of the prior art devices.

It is, therefore, one object of this invention to provide an improved vibration detector for monitoring sounds and vibrations originating in mechanical and electromechanical equipment.

Another object of this invention is to provide such an improved vibration detector which exhibits an improved frequency response relative to the capability of most prior art equipment.

A further object of this invention is to provide as a part of such a detector a probe or pick-up means which produces minimal loading of the noise source so as not to disturb the normal operating characteristic of the monitored element.

A still further object of this invention is to provide such a device in a form which exhibits a relatively high selectivity or a capability for distinguishing the desired noise signal from ambient disturbances.

A still further object of the invention is to provide adequate shielding of the transducer element against such specific external disturbances as electric and magnetic fields and ambient mechanical noise.

A still further object of this object of this invention is to provide a probe and transducer arrangement which is relatively invulnerable to damage from temperature, humidity and mechanical shock.

Yet another object of this invention is to provide such a vibration detector with applicability to the continuous monitoring of a multiplicity of vibration sources in a critical system as a means for predicting and preventing impending equipment malfunctions.

Further objects and advantages of the invention will become apparent as the following description proceeds and the features of novelty which characterize this invention will be pointed out with particulariity in the claims annexed to and forming a part of this specification.

BRIEF DESCRIPTION OF THE DRAWING

The present invention may be more readily described by reference to the accompanying drawing, in which.

DESCRIPTION OF THE PREFERRED EMBODIMENT

Figure 1:
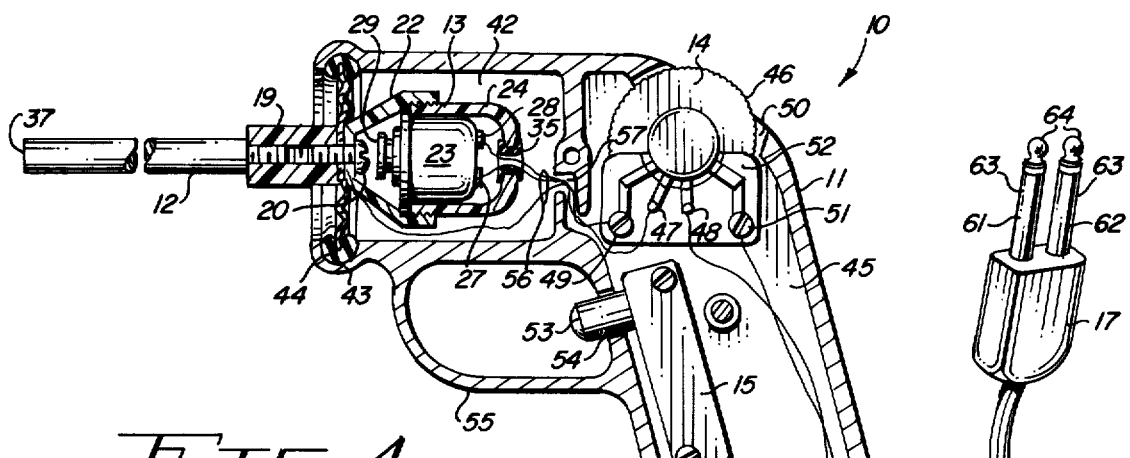
FIG. 1 is a cross-sectional view of the hand-held vibration pickup unit of the invention.

Referring more particularly to the drawing by characters of reference, FIG. 1 discloses the vibration pickup unit 10 of the invention, the unit 10 comprising a plastic or metal casing or housing 11 shaped in the form of a pistol or handgun, a cylindrical brass probe 12, a transducer assembly 13, a volume control 14, an on/off switch 15, an output signal cord 16 and a phone plug 17.

Figure 4:
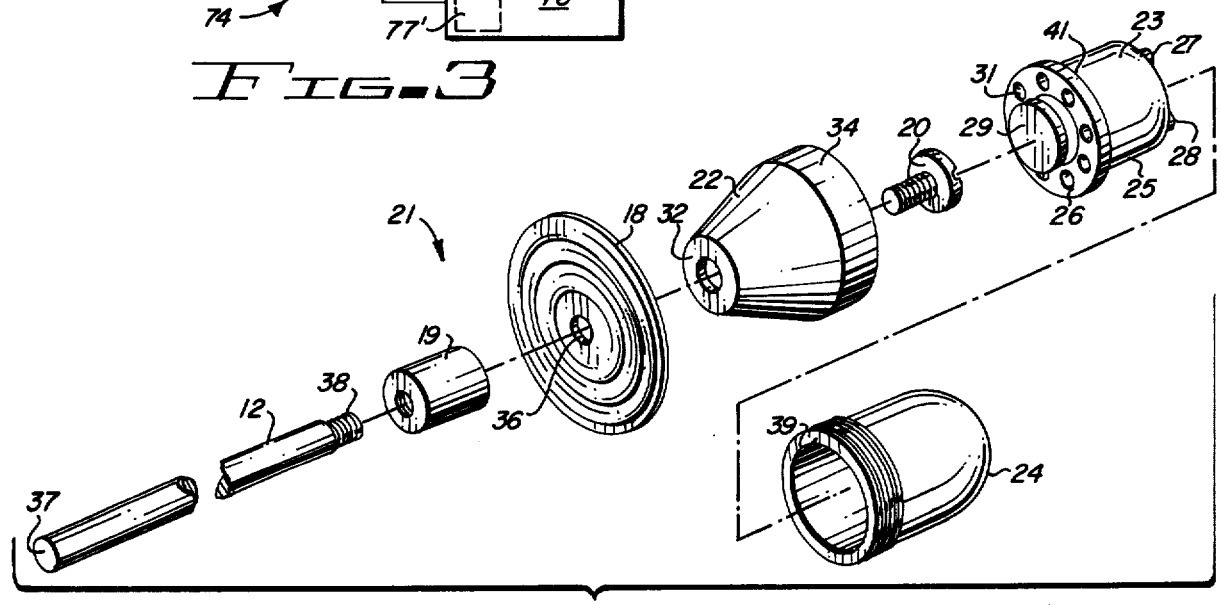
FIG. 4 is an exploded view of the probe and transducer assembly employed in the pickup unit of FIG. 1.

The probe 12 and the transducer 13 are coupled together and secured to a brass diaphragm 18 by means of a tapped and drilled tube 19 and a screw 20. Details of the transducer and probe assembly 21 are more clearly shown by the exploded view of FIG. 4 in which the assembly is seen to comprise the probe 12, the tube 19, the diaphragm 18, a mounting cone 22, the screw 20, a specially adapted dynamic microphone 23 and a microphone shield 24.

The microphone 23 is adapted from a conventional three-quarter inch dynamic magnetic microphone characterized by exterior details including the dome-shaped ferrous housing 25 with its flared front opening to which is attached the circular diaphragam 26. The diaphragm 26 supports a voice coil inside the microphone 23, the voice coil being wound on a cylindrical coil form surrounding a permanent magnet. The permanent magnet is secured to the housing 25 so that as sound waves striking the diaphragm 26 produce mechanical vibration of the diaphragm the voice coil is moved between the magnet and the ferrous housing 25 through the magnetic field. An electrical signal is thus induced in the voice coil. The voice coil is terminated in two screw-type terminals 27 and 28 at the rear of housing 25.

Adaptations to the microphone 23 for use in the pickup unit 10 include the attachment of a button-shaped brass or plastic weight 29 to the center of the exterior surface of the microphone diaphragm 26 and the provision of several small holes 31 through the diaphragm 26, the holes 31 being uniformly spaced about the periphery of the weight 29. These adaptations are key to the performance of the transducer 13 in cooperation with the probe 12 and their specific functions will be discussed following the description of the other details of the assembly.

The mounting cone 22, which may be made of brass, bakelite, plastic or other non-ferrous material is hollow and blunted by a flat surface 32 at its front end, the surface 32 being perpendicular to the axis of cone 22. A hole 33 through the center of surface 32 provides clearance for the body but not the head of screw 20. The conical outer surface of cone 22 terminates at the rear in a short hollow cylindrical section 34. The inside of section 34 is threaded to receive the threaded front end of the cylindrical dome-shaped shield 24. The shield 24 may also be constructed of an appropriate non-ferrous material such as brass, plastic or bakelite. A hole at the rear end of shield 24 holds a rubber grommet 35.

The diaphragm 18 is circular and has a small center hole 36 which provides clearance for the body of screw 20. Annular ripples or waves are incorporated in the diaphragm 18 to enhance its ability to deform in response to pressure applied perpendicularly at its center.

The elongated cylindrical probe 12 has a flat front end 37 and a threaded rear end 38 of reduced diameter which is dimensioned to mate with the threaded bore of tube 19.

To assemble the individual parts of assembly 20, end 38 is first threaded into the front end of tube 19. Screw 20 is then passed through hole 33 from inside cone 21 and then through hole 36 of diaphragm 18 after which it is threaded into the rear end of tube 19 and tightened securely. The front end of microphone 23 is then moved inside cone 21 until the periphery of the front surface of its diaphragm 26 comes to bear against a mating annular flat surface inside cone 22 located near the forward end of section 34. The shield 24 is then passed over the rear end of microphone 23 and its forward end is threaded into the rear end of cone 22. As shield 24 is threaded into cone 22 the front edge 39 of shield 24 comes to bear against the rear surface 41 of the flared front end of housing 25, the microphone 23 being thus supported and secured within a protective housing comprising the cone 22 and the shield 24, while the probe 12, the tube 19, the cone 22, the microphone 23, and the shield 24 are supported by and secured to the diaphragm 18 by means of the single screw 20.

Referring again to FIG. 1, a cylindrical cavity 42 is provided at the front end or barrel portion of housing 11 to receive the assembly 21. An annular groove 43 inside the circular opening at the front end of cavity 42 carries a rubber grommet 44 which supports and secures the periphery of diaphragm 18, the grommet 44 thus supporting thereby the entire assembly 21 of FIG. 4.

A second cavity 45 to the rear of cavity 42 and located within the hand-grip portion of housing 11 is provided to contain the volume control 14 and the switch 15.

The volume control 14 is a potentiometer with a disc shaped control dial 46, solder terminals 47 and 48 and screw terminals 49 and 51. Control 14 is secured to a printed circit board 52 and is positioned within cavity 45 to permit the protrusion of dial 46 through a slot 50 in housing 11 at the top of the cavity 45 where it may conveniently be operated by the thumb of the hand which is holding the unit 10.

The switch 15 is a conventional microswitch so positioned within cavity 45 as to permit its operating button 53 to extend through a hole 54 in housing 11 at the "trigger" position inside a trigger guard 55 where it may conveniently be operated by the index finger of the hand holding the unit 10.

Electrical wiring 56 between the microphone 23 and the volume control 14 passes through grommet 35 and through a passage 57 which communicates between cavities 42 and 45. Electrical wiring 58 between control 14, switch 15 and cable 16 passes from cavity 45 through a grommet 59 at the base of cavity 45.

Figure 2:
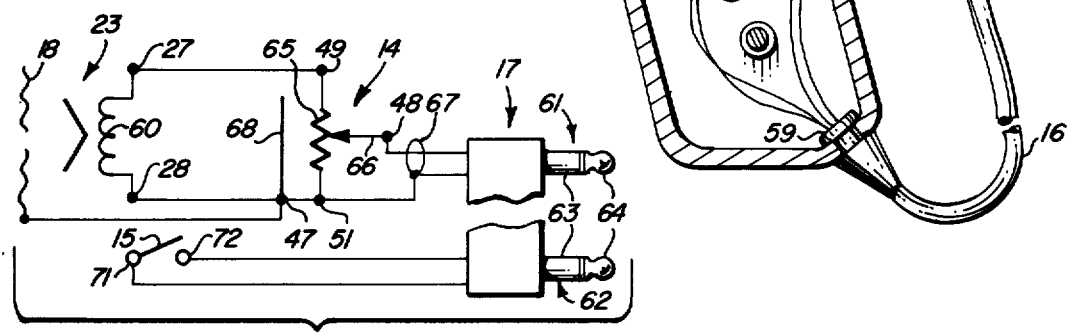
FIG. 2 is a diagrammatic representation of the pickup unit of FIG. 1.

The electrical interconnections involved are shown in FIG. 2 in which are represented the diaphragm 18, the control 14, the switch 15, the plug 17 and the voice coil 60 of microphone 23. The plug 17 has two coaxial pins 61 and 62, each having an outer shell 63 and a concentric inner pin terminating in a tip 64 which extends through the end of the shell 63. Shell 63 is insulated from tip 64. As indicated in FIG. 2, terminal 27 of coil 60 is connected to terminal 49 at one end of resistive element 65 of control 14. Terminal 28 of coil 60 is connected to terminal 51 at the other end of the resistive element 65. Terminal 48, which is tied to the movable brush 66 of control 14 is connected to tip 64 of pin 61 while terminal 51 is connected to shell 63 of pin 61 and to the shield 67 of cable 16. Also connected to pin 51 are the diaphragm 18 and terminal 47 which is tied to the case 68 of control 14, these connections being made to provide electrostatic shielding of the low-level circuitry involving microphone 23 and control 14.

The switch 15 is a single-pole, single-throw switch with only two terminals, 71 and 72. Terminal 71 is connected to the shell 63 of pin 62 while terminal 72 is connected to tip 64 of pin 62.

In the operation of the pickup unit 10, the user grips the handle of the unit 10 and places end 37 of probe 12 against the point in a piece of equipment at which he wishes to monitor vibrations. Vibrations from the equipment are transmitted through probe 12 and produce sympathetic vibrations involving the housing 25 of microphone 23 which carries with it the permanent magnet structure inside microphone 23. The flexibility of diaphragm 18 which supports the prove and transducer assembly 21 within housing 11 permits such sympathetic vibrations of housing 25 while the inertia of weight 29 attached to diaphragm 26 holds diaphragm 26 and the attached voice coil 60 of microphone 23 relatively stationary so that relative motion between the voice coil 60 and the magnetic structure of microphone 23 is achieved in response to the monitored equipment vibrations. The voltage thus induced in voice coil 60 is applied across resistive element 65 of control 14. A portion of the total induced voltage as determined by the setting of control 14 is delivered to pin 61 of plug 17.

The provision of the holes 31 in diaphragm 26 as an adaptation of microphone 23 improve the sensitivity and frequency response of microphone 23 by providing a path through which air may enter and exhaust from the interior of microphone 23 as diaphragm 26 moves in and out in response to vibration signals. Without the holes 31 the trapped air inside microphone 23 resists the motion of diaphragm 26 and adversely affects its sensitivity and frequency response.

Figure 3:
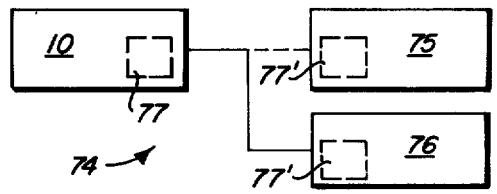
FIG. 3 is a block diagram showing the utilization of the pickup unit of FIGS. 1 and 2 along with a speaker and a set of head phones employed as alternate or dual read-out devices.

FIG. 3 illustrates the utilization of the pickup unit 10 as a part of vibration detection system 74 which may comprise the unit 10 and a speaker unit 75 as a first option, the unit 10 in conjunction with an earphone set 76 as a second option, or the unit 10 with dual readout means comprising both the speaker unit 75 and the earphone set 76. An amplifier 77 is required to drive either the speaker unit 75 or the earphone set 76 and it may be located in the pickup unit 10. Alternatively, the speaker unit 75 and the earphone set 76 may individually incorporate amplifiers 77' as indicated in FIG. 3.

Figure 5:
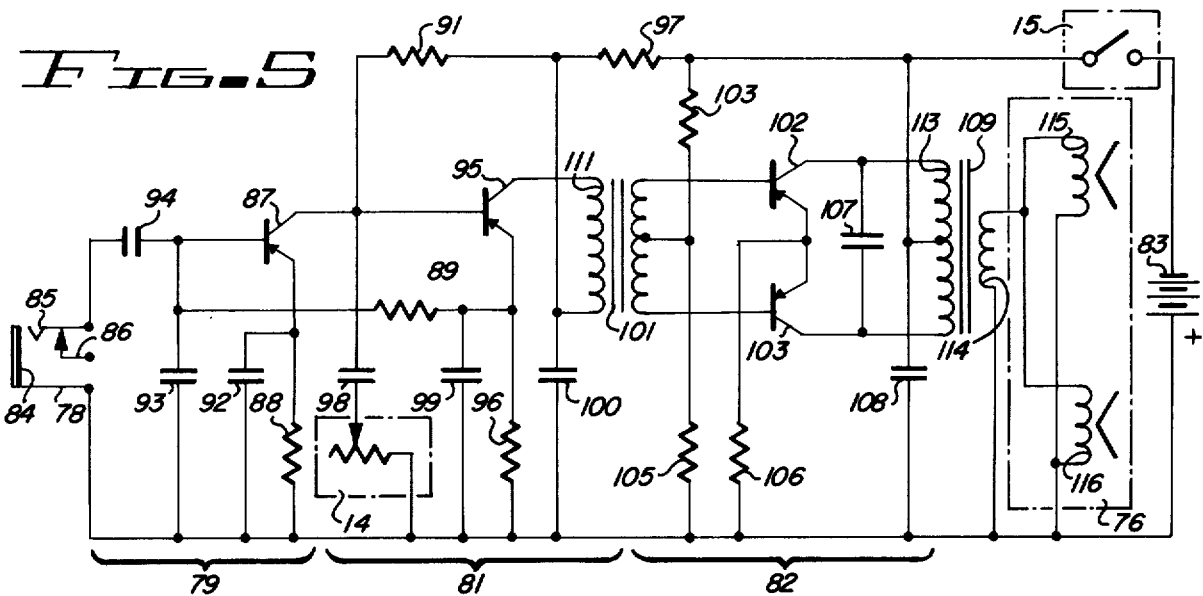
FIG. 5 is a schematic diagram showing an audio amplifier connected to drive a set of headphones which may be employed to monitor the output of the pickup unit of FIGS. 1 and 2.

A conventional audio amplifier 77, 77' as shown in FIG. 5 may be employed in the alternate systems 74 of FIG. 3, the amplifier 77, 77' comprising a phone jack 78, first and second pre-amplifiers 79 and 81 and a push-pull power stage 82. The earphone set 76 is shown connected as a load and the switch 15 is connected to serve as a power on/off switch from a battery 83.

The jack 78 is a standard phone jack which mates with pin 61 of plug 17. Jack 78 has a ring contact 84, a spring contact 85 and a shorting contact 86. The ring contact 84 makes connection with shell 63 of pin 61 and the spring contact 85 makes connection with tip 64 of pin 61 when pin 61 is inserted in jack 78. As spring contact 85 is displayed upward by tip 64 the shorting contact 86 is opened.

The first preamplifier 79 comprises a PNP transistor 87, emitter, base and collector resistors 88, 89 and 91, respectively, and capacitors 92, 93 and 94; the second preamplifier 81 comprises a PNP transistor 95, an emitter resistor 96, collector resistor 97, capacitors 98, 99 and 100 and output transformer 101; power stage 82 comprises two PNP transistors 102 and 103, resistors 104, 105 and 106, capacitors 107 and 108, and output transformer 109. Resistors 88, 89, 91, 96 and 97 establish the d-c bias conditions for the preamplifier stages 79 and 81. Capacitor 94 couples the input signal from jack 78 to the base of transistor 87. Capacitor 92 bypasses emitter resistor 88 to provide high a-c amplification in amplifier 79 while negative feedback involving resistor 89 and capacitor 93 insures stable operation. The output signal of amplifier 79 as developed across collector resistor 91 is directly coupled to the base of transistor 95. Capacitor 99 acts as a bypass capacitor across emitter resistor 96, again to enhance the a-c gain, and capacitor 100 provides a low-impedance path for the a-c component of collector current driving transformer 101. While FIG. 2 shows the volume control 14 as connected directly across the voice coil 60 of mircophone 23, FIG. 5 shows an alternate connection of control 14 in the input circuit of amplifier 95. Here it is connected as a variable resistance through capacitor 98 to the base of transistor 95 where it acts to control the signal level developed by amplifier 79 and delivered to amplifier 81. Transformer 101 has a primary winding 111 and a center-tapped secondary winding 112, the two halves of the secondary winding being connected to drive in push-pull operation the bases of transistors 102 and 103 of amplifier 82 so that as transistor 102 is driven further into conduction, transistor 103 is driven toward cutoff and vice versa. The connection of the collectors of transistors 102 and 103 to opposite ends of the center-tapped primary winding 113 of transformer 109 thus produces an a-c signal therein while subjecting it to a minimal net d-c current level to prevent saturation. The output of transformer 109 as developed in output winding 114 is connected directly to the voice coils 115 and 116 of earphone set 76. An amplifier similar to that shown in FIG. 5 is available from Radio Shack — A Tandy Corporation Company.

Figure 6:
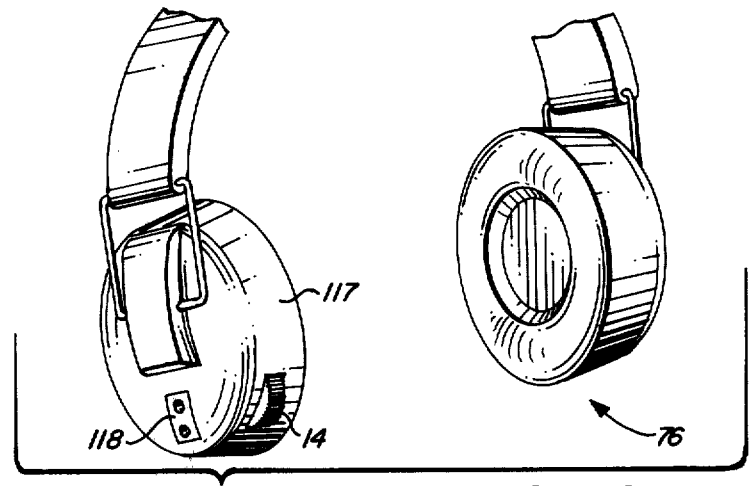
FIG. 6 is a perspective view of a set of headphones adapted for use as a read-out device for use with the pickup unit of FIGS. 1 and 2.

In FIG. 6 a specially adapted earphone set 76 is shown in which the amplifier 77' and the control 14 are incorporated in one earpiece 117. Connection to the pickup unit is made by means of a miniature jack 118.

Figure 7:
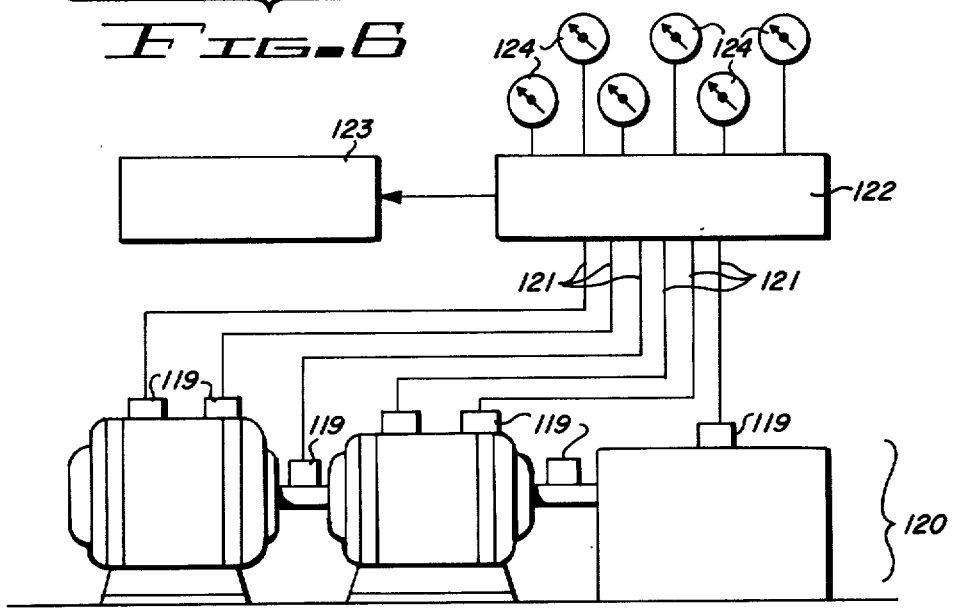
FIG. 7 is a diagrammatic representation showing a number of specially adapted pickup units attached to a motor-generator set and connected to a computer and associated read-out devices and alarms for the continuous monitoring of the motor-generator set during its operation.

In FIG. 7 a number of modified pickup units 119 are affixed at different points on a system of an operating equipment 120. The signals from the several pickup units are connected by lines 121 to a computer unit 122 which incorporates the necessary amplifiers, adjustable threshold detectors and drive circuits to sound an alarm 123 in the event an excessively high noise level is detected by any of the sensors 119 and to energize one of the indicators 124 which identifies the particular sensor 119 which has detected the high noise level. Sequential selection of the individual pickup units 119 and of the corresponding identifying indicators 124 may be incorporated in computer 122. Through this approach a single amplifier can be made to serve the several pickup units. The indicators may comprise meter read-outs which show the noise level, or lamp type indicators may be employed if only the identification of the pickup unit is required.

A practical and effective vibration detector is thus provided in conjunction with alternate means of application as set forth in the stated objects of the invention. Although but a single embodiment with a few variations has been described it will be apparent to those skilled in the art that various changes and modifications may be made therein without departing from the spirit of the invention or from the scope of the appended claims.

What is claimed is:

1. A vibration detector for translating mechanical vibratory motion into electrical values comprising:
   a casing formed with an internal chamber,
   a transducer assembly mounted in the chamber of said casing,
   said assembly comprising a hollow non-ferrous cone having an apex,
   a first metallic diaphragm attached on one of its sides to an opening through the apex of said cone,
   a dynamic microphone,
   said microphone being mounted within a housing attached to said cone and comprising a voice coil, an associated second diaphragm, and a permanent magnet attached to said housing, said housing being arranged to extend within said cone, an elongated insulator, a metallic probe connected to one end of said insulator, the other end of said insulator being connected to said first diaphragm, and weight means attached to said second diaphragm for holding it and said voice coil relatively stationary, whereby vibrations transmitted through said probe produce sympathetic vibrations in said housing while said weight means attached to said second diaphragm holds it and said voice coil relatively stationary thus inducing a voltage in said voice coil representative of the vibration by said probe.

2. The vibration detector set forth in claim 1 wherein:
said second diaphragm is provided with a plurality of spaced holes therethrough serving as air passageways for increasing the sensitivity and frequency response of said microphone.

3. The vibration detector set forth in claim 1 wherein:
said casing is in the form of a handgun, and
said probe extends therefrom simulating the barrel of the handgun.

4. The vibration detector set forth in claim 1 in further combination with:
an amplifier connected to said voice coil for amplifying its output, and
means for controlling the output volume of said amplifier.

5. The vibration detector set forth in claim 2 in further combination with:
an amplifier mounted in said casing and connected to said voice coil for amplifying its output, and
means for controlling the output of said amplifier.

6. The vibration detector set forth in claim 4 in further combination with:
a set of earphones,
said amplifier and means for controlling said volume being mounted in said earphones.

7. A system for sensing the mechanical vibration motions of various parts of a mechanical assembly and translating each motion sensed into an electrical signal comprising:
at least two vibration detectors,
each of said detectors comprising:
a casing formed with an internal chamber,
a transducer assembly mounted in the chamber of said casing,
said assembly comprising a hollow non-ferrous cone having an apex,
a first metallic diaphragm attached on one of its siddes to an opening through the apex of said cone,
a dynamic microphone,
said microphone being mounted within a housing attached to said cone and comprising a voice coil, an associated second diaphragm, and a permanent magnet attached to said housing,
said housing being arranged to extend within said cone,
an elongated insulator,
a metallic probe connected to one end of said insulator,
the other end of said insulator being connected to said first diaphragm, and
weight means attached to said second diaphragm for holding it and said voice coil relatively stationary,
whereby vibrations transmitted through said probe produce sympathetic vibrations in said housing while said weight means attached to said second diaphragm holds it and said voice coil relatively stationary thus inducing a voltage in said voice coil representative of the vibration sensed by said probe, and
means for translating said voltage of each detector to an observable signalling device.

8. The system set forth in claim 7 in further combination with:
sequencing means for selectively sensing the signals of said detectors.

* * * * *